US006984983B2

(12) United States Patent
Tabanou

(10) Patent No.: US 6,984,983 B2
(45) Date of Patent: Jan. 10, 2006

(54) SYSTEM AND METHOD FOR EVALUATION OF THINLY LAMINATED EARTH FORMATIONS

(75) Inventor: Jacques R. Tabanou, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 424 days.

(21) Appl. No.: 10/159,216

(22) Filed: May 31, 2002

(65) Prior Publication Data

US 2003/0222651 A1 Dec. 4, 2003

(51) Int. Cl.
 *G01V 3/20* (2006.01)

(52) U.S. Cl. ...................................... 324/367; 324/347
(58) Field of Classification Search ................. 324/347, 324/324, 366–367, 355–356, 369–370, 374
 See application file for complete search history.

(56) References Cited

U.S. PATENT DOCUMENTS

| | | | |
|---|---|---|---|
| 3,973,181 A | | 8/1976 | Calvert |
| 5,339,037 A | | 8/1994 | Bonner et al. |
| 5,461,562 A | | 10/1995 | Tabanou et al. |
| 6,025,722 A | | 2/2000 | Evans et al. |
| 6,191,588 B1 | | 2/2001 | Chen |
| 6,765,386 B2 | * | 7/2004 | Gianzero et al. ........... 324/367 |
| 2003/0197510 A1 | * | 10/2003 | Gianzero et al. ........... 324/367 |

FOREIGN PATENT DOCUMENTS

| | | |
|---|---|---|
| GB | 2384861 A | 8/2003 |
| WO | WO02/086459 A1 | 10/2002 |
| WO | WO03/076968 A1 | 9/2003 |

OTHER PUBLICATIONS

Cheung, P. et al., Field Test Results of a New Oil–Base Mud Formation Imager Tool, pp. 1–14.
Tabanou, Jacques et al., Which Resistivity Should be Used to Evaluate Thinly Bedded Reservoirs in High–Angle Wells?, SPWLA $40^{th}$ Annual Logging Symposium, May 30–Jun. 3, 1999, pp. 1–14.
Shray, Frank et al., Evaluation of Laminated Formations Using Nuclear Magnetic Resonance and Resistivity Anisotropy Measurements, Society of Petroleum Engineers, Oct. 17–19, 2001, pp. 1–17.

* cited by examiner

*Primary Examiner*—Bot LeDynh
(74) *Attorney, Agent, or Firm*—Kevin P. McEnaney; Brigitte Echols; Victor H. Segura

(57) ABSTRACT

A unique means in interpreting anisotropic reservoirs in thinly laminated earth formations regardless of the hole deviation is provided. A high-resolution micro-resistivity formation measurement is used to estimate in real time at the well site the formation anisotropic electrical parameters oriented around the borehole drilled with a conductive fluid. Estimations of the formation anisotropy or hydrocarbon profile are compared and combined with indicators associated with the formation to provide improved evaluations of hydrocarbon content over conventional methods.

31 Claims, 12 Drawing Sheets

SYSTEM AND METHOD FOR EVALUATION OF THINLY LAMINATED EARTH FORMATIONS

BACKGROUND OF THE INVENTION

1. Field of the Invention

The invention relates generally to the analysis of underground earth formations, and, more particularly, to the determination of formation resistivity properties and hydrocarbon profiles of same.

2. Background Art

Knowledge of the resistivity properties of underground earth formations is fundamental in the evaluation and characterization of potential and existing hydrocarbon-bearing reservoirs. Resistivity measurements from within a borehole drilled through these formations have been made by a number of techniques employing the use of well-known tools or instruments, including induction, propagation, neutron, sonic, and laterolog (electrode) type devices.

The systematic measurement of properties or variations in a characteristic of the formations around a borehole and the recording of such measurements as a function of depth and/or time is commonly referred to as a "log" or "logging." Well logs are typically recorded by inserting the various types of measurement tools into a borehole, moving the tools along the borehole, and recording the measurements made by the tools.

Conventional logging techniques include "wireline" logging and logging-while-drilling (LWD), also referred to as measurement-while-drilling (MWD). Wireline logging entails lowering the measuring tool into a drilled borehole at the end of an electrical cable to obtain the subsurface measurements as the instrument is suspended within the borehole. LWD/MWD entails attaching the tool disposed in a drill collar to a drilling assembly while a borehole is being drilled through the formations. [As used herein, LWD/MWD is intended to include the taking of measurements in an earth borehole, with the drill bit and at least some of the drill string in the borehole, during drilling, pausing, and/or tripping.]

In LWD/MWD operations, drilling fluid (mud) is used to lubricate and cool the drill bit and to carry borehole cuttings upwardly to the surface as the borehole is drilled. Drilling muds are generally either water based or oil based. Since 1990, synthetic-based muds have also been introduced in the industry.

The mud is also used in LWD operations to transmit measurement data to the surface using a pressure modulation telemetry system, which modulates pressure of the mud flowing through the interior of the drilling tool assembly. A much larger amount of well log data is typically stored in a recording device disposed in the logging tool, which is interrogated when the tool is retrieved from the borehole. A record of tool position in the borehole with respect to time is then correlated to the time/measurement record retrieved from the tool storage device to generate a conventional "well log" of measurements with respect to borehole depth.

Geologists and petrophysicists historically have found it necessary to visually analyze full well cores extracted from zones of interest to assess complex thinly laminated (also referred to as bedded) reservoirs and aid in the discovery and evaluation of hydrocarbon reservoirs. High-resolution "micro-resistivity" measurement techniques have also been developed over the years to contribute to the identification of hydrocarbons in low resistivity pay zones in wells drilled with water-based mud. One such conventional high-resolution logging tool is described in U.S. Pat. No. 6,191,588 (assigned to the present assignee) and in Cheung P., et al., *Field Test Results of a New Oil-Base Mud Formation Imager Tool*, SPWLA 2001, paper XX.

High-resolution measurements have also helped improve the estimation of reserves in such reservoirs. These techniques require that the mud be conductive, usually a mixture of salt water and weighting solid materials to control mud density. Latter measurement techniques, such as ones based on the tool described in the '588 patent, provide high-resolution images of the borehole wall surface. These techniques provide several high-resolution micro-resistivity measurements capable of detecting the presence of thin layers of the order of several tens of inches to a few inches. Such layers are much too thin to be accurately measured by standard resistivity logging tools since the layer thickness are much smaller than the vertical resolution of standard tools.

Most resistivity measurement tools have been designed to investigate on the order of about 1 to 3 feet [0.3–0.91 m] into the reservoir beyond the invaded zone. Such invaded zone is always present when the well is drilled with a water-base mud. However, more and more new wells are being drilled with oil-based mud containing chemical additives that build and leave a thin impermeable mudcake and usually prevent significant invasion into the permeable zones around the borehole.

Comparisons between full well cores and micro-resistivity logs or images have contributed to industry acceptance of this technology in evaluating the potential of the reservoir by simply "counting" the sand layers. In shaly sand formations, the shale layers are usually of low resistivity while the sand layers saturated with hydrocarbons will have a much higher resistivity. The same sand layers, depending on their grain size, are less resistive than the sand layers containing hydrocarbon and are often even less resistive than the shale layers. In turbiditic depositional environments, one can often find water-bearing sand layers with resistivity in the range of 0.1 to 0.5 ohm-meters, shale layers in the range of 0.4 to 5 ohm-meters, while hydrocarbon sand layers can reach a resistivity of several tens or hundred ohms-meter depending on their porosity and hydrocarbon content. Interlaced with these sand-shale layers, some tight layers with very high resistivity, often greater than thousands of ohms-meters, might also be present.

Evaluation of thinly laminated reservoirs is not a new problem in formation evaluation and interpretation. See, for example, U.S. Pat. Nos. 3,166,709, 5,461,562 (assigned to the present assignee). Historically there have been three methods used by the industry to evaluate thinly laminated reservoirs:

1. Sand Count: Counting the sand layers and cumulating the total sand length;
2. SHARP: Synergetic High Resolution Analysis and Reconstruction for Petrophysical Evaluation; and
3. Anisotropy measurement: Measurement of bulk anisotropic formation parameters.

Sand Count. The simplest technique is referred to as "Sand Count." It is a technique used in conjunction with conventional micro-resistivity devices. This method attempts to classify each detected layer into one of several classes. Whenever the micro-resistivity log value of a given layer is falling into the specific resistivity limits, that layer is assigned to a specific class. However the micro-log generally provided two micro-resistivity logs with different depths of investigation. In front of permeable beds, a separation caused by the mud-cake buildup would signify that a layer was permeable and should not be confused with a tight streak that would not cause any separation between the two micro-resistivity logs. The simplest interpretation model has a minimum of two classes, a "sand class" and a "shale class." Four classes are often found necessary to perform a more accurate sand count in more complex environments.

SHARP. The SHARP method combines tool measurements with different vertical resolution. It takes advantage of one or several high resolution logs to define the precise location of the boundaries of each thin layer detected by the high-resolution logs. However the resistivity value estimated by the tool(s) is usually not the true resistivity of the layers. The micro-resistivity is usually lower than the true resistivity of the layers because of invasion, especially when the mud is conductive. The main concept behind SHARP is that the convolution of a high resolution log with a vertical response function, representing the vertical tool response of a low resolution log, should match the low resolution real log whenever the high resolution log represents the true value of each layer. The SHARP technique is further described in U.S. Pat. No. 5,461,562.

Anisotropy Measurement. An earth formation is anisotropic whenever its petrophysical properties are different in two distinct directions. For instance the resistivity of an earth formation is usually found to be higher when measured across the bedding planes and lower when it is measured parallel to the same bedding plane. Formation resistivity anisotropy is a characteristic of reservoirs that can complicate formation evaluation. Many reservoir rocks exhibit resistivity anisotropy, especially when saturated with oil. There are several mechanisms, which can produce this anisotropy, among which are very thin sand-shale laminations, depositional changes in clean sandstone, and wind-distributed sands (aeolian formations). See Rubin, D. M., *Cross bedding, bedforms, and paleocurrents*, SOCIETY OF ECONOMIC PALEONTOLOGISTS AND MINERALOGISTS, CONCEPTS IN SEDIMENTOLOGY AND PALEONTOLOGY, 1; Klein et al., *The petrophysics of electrically anisotropic reservoirs*, Transactions of the SPWLA THIRTY-SIXTH ANNUAL LOGGING SYMPOSIUM, Paris, France, Jun. 26–29, 1995, paper HH.

Formation anisotropy is not restricted to resistivity. Earth formations also exhibit permeability and acoustic anisotropy. Conventional propagation-type logging instruments are sensitive to anisotropy and can be used to estimate it in deviated wells or high relative dip situations. Recently, triaxial induction-type instruments have been introduced in the industry to make such estimates regardless of the hole deviation and value of relative dip. Combinations of existing resistivity logging instruments allow for the estimation of formation anisotropy. However this latter method is primarily limited to wells drilled with conductive muds.

Thus there remains a need for improved techniques for evaluating anisotropy profiles and hydrocarbon reserves of thinly laminated earth formations, particularly where the borehole is drilled with a substantially conductive fluid.

SUMMARY OF THE INVENTION

One aspect of the invention is a method for evaluating a thinly bedded earth formation traversed by a borehole to determine the formation anisotropy or hydrocarbon profile. With the borehole containing a substantially non-conductive fluid, the method comprises injecting a current into the formation and measuring a signal associated with the injected current to determine a formation resistivity parameter. A parallel resistivity value $R_h$ and a perpendicular resistivity value $R_v$ of the formation are then calculated using the determined resistivity parameter. The anisotropy or hydrocarbon profile is then determined using the calculated parallel resistivity value $R_h$ and perpendicular resistivity value $R_v$.

Another aspect of the invention is a system for evaluating a thinly laminated earth formation traversed by a borehole containing a substantially non-conductive fluid to determine the formation anisotropy or hydrocarbon profile. The system comprises a logging tool adapted for disposal through the borehole; the tool adapted to inject a current into the formation and to measure a signal associated with the injected current to determine a formation resistivity parameter; a computer processor programmed to: calculate a parallel resistivity value $R_h$ and a perpendicular resistivity value $R_v$ of the formation using the determined formation resistivity parameter; and determine the anisotropy or hydrocarbon profile using the calculated parallel resistivity value $R_h$ and perpendicular resistivity value $R_v$.

BRIEF DESCRIPTION OF THE DRAWINGS

Other aspects and advantages of the invention will become apparent upon reading the following detailed description and upon reference to the drawings in which.

DETAILED DESCRIPTION

Figure 1:
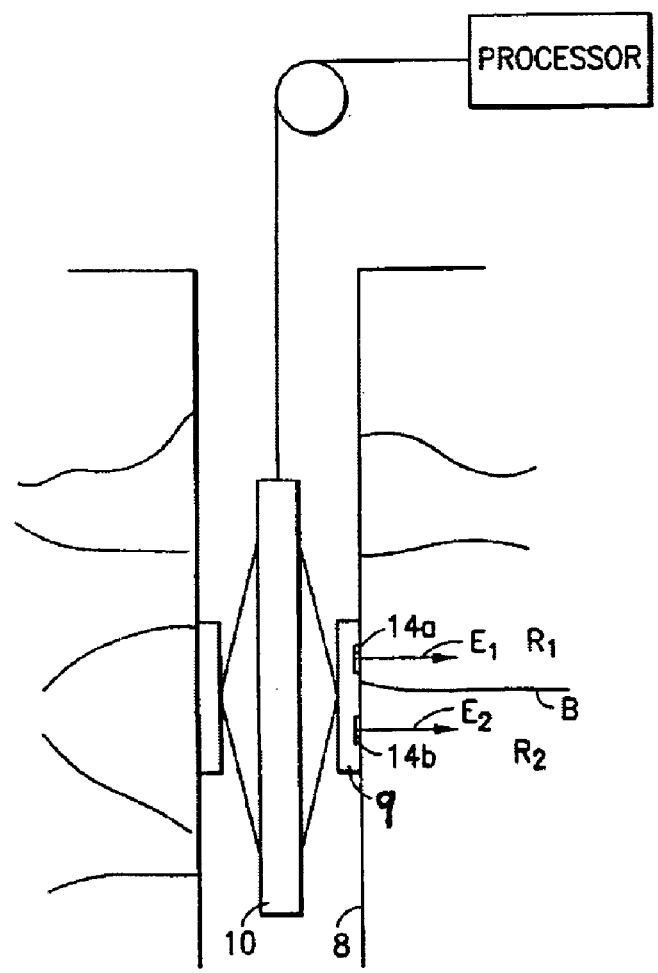
FIG. 1 is a schematic drawing of a conventional micro-resistivity logging tool.
Figure 2:
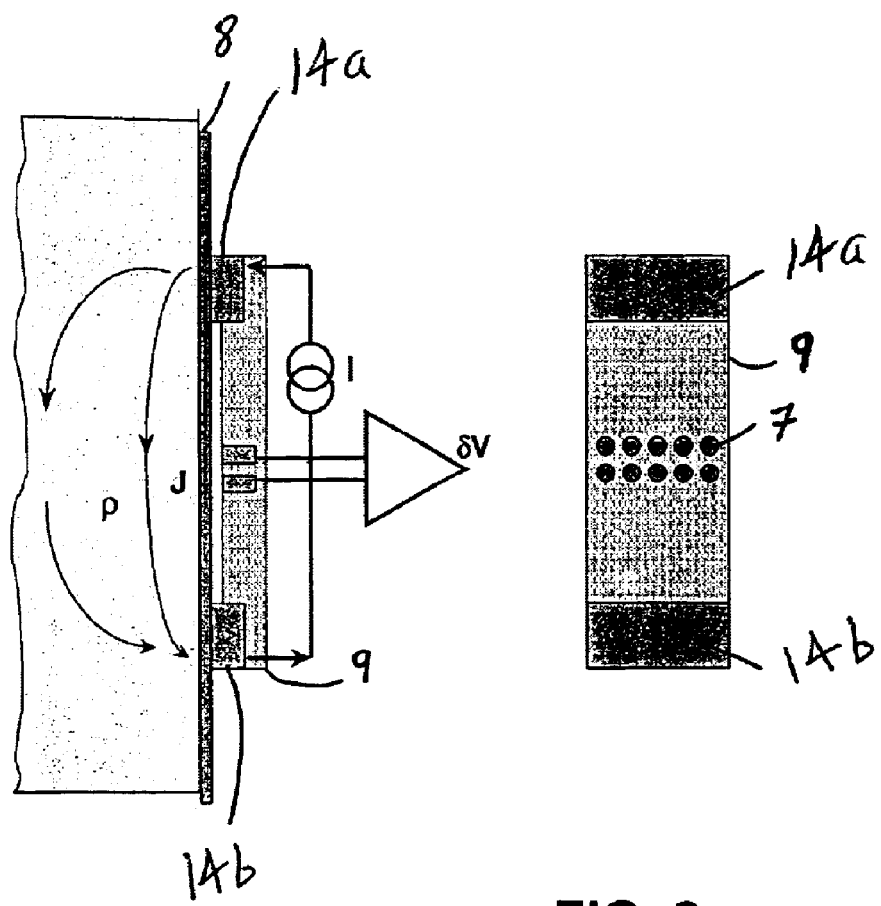
FIG. 2 is an electrical schematic illustrating the electrode configuration of the tool of FIG. 1.

This invention provides a unique means in interpreting anisotropic reservoirs regardless of the hole deviation. FIG. 1 shows a logging tool 10 (for example as disclosed in U.S. Pat. No. 6,191,588) that may be used to implement the invention. FIG. 2 shows the electrode 14a, 14b configuration and electronics implemented in one of the multiple micro-resistivity pads 9 of the tool 10. While each pad 9 makes multiple independent micro-resistivity measurements, this is a non-limiting example of a tool that may be used to implement the invention. It will be understood by those skilled in the art that the invention can be implemented with any tool adapted to make one or more micro-resistivity measurements, i.e., the tool does not need to be equipped with an array of sources/sensors.

As shown in FIG. 1, electrodes 14a and 14b are located on opposite sides of a bed boundary B that separates beds having different resistivities $R_1$ and $R_2$. With the pad 9 in contact with the borehole wall 8, the electric field near the pad is perpendicular to the pad face or parallel to the bed boundary B. The parallel component of the electric field is continuous across the two different media as shown by $E_1=E_2$, where $E_1$ and $E_2$ are the electric fields on the two sides of the bed boundary B.

As shown in FIG. 2, alternating current is injected into the borehole wall 8 and into the formation from the current electrodes 14a, 14b located at the top and bottom of the pad 9. Signals associated with the injected current, in this case voltage differences $\delta V$, are measured on voltage electrodes 7 located at the pad center. Because of the anisotropy paradox such a vertical array of injectors and voltage sensors respond in first order to the resistivity in a direction that is perpendicular to the pad face. Therefore in a vertical hole with zero formation dip, the tool 10 measures essentially the horizontal resistivity $R_h$. [As used herein, $R_h$ refers to resistivity parallel to the bedding and $R_v$ to resistivity perpendicular to the bedding.] Further description regarding the micro-resistivity measurements of the invention is found in U.S. Pat. No. 6,191,588.

Figure 3:
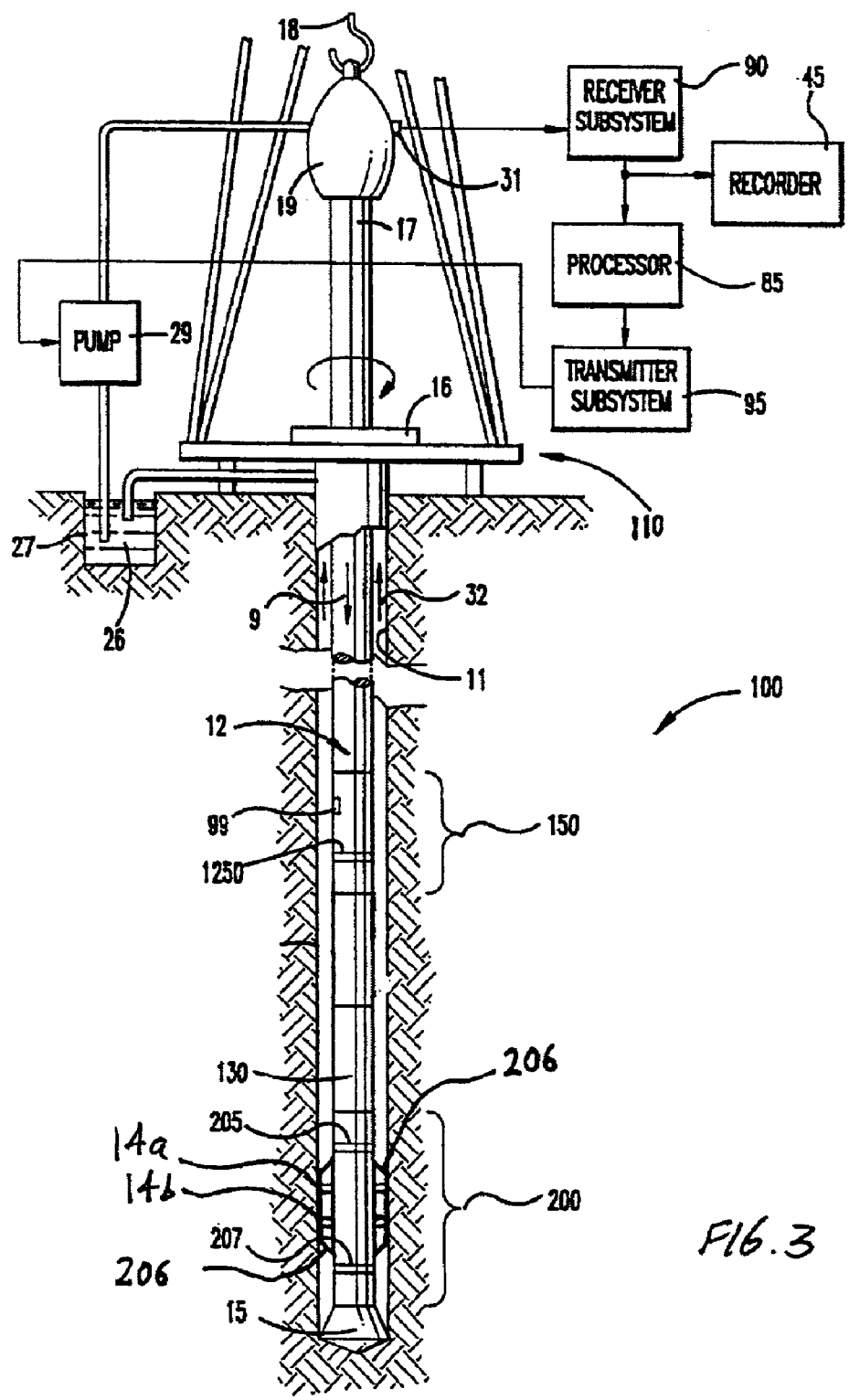
FIG. 3 is a schematic drawing of a logging-while-drilling system that can be implemented in accord with the invention.

FIG. 3 shows a system 100 of the invention. In this embodiment, an LWD tool 200 (for example as disclosed in U.S. Pat. No. 5,339,037) may be used to implement the invention. A platform and derrick 110 are positioned at the earth surface over the borehole that is formed in the earth by rotary drilling. A drill string 12 is suspended within the borehole and includes a drill bit 15 at its lower end. The drill string 12 and the drill bit 15 attached thereto are rotated by a rotating table 16 (energized by means not shown) which engages a kelly 17 at the upper end of the drill string. The drill string is suspended from a hook 18 attached to a traveling block (not shown). The kelly is connected to the hook through a rotary swivel 19 which permits rotation of the drill string relative to the hook.

Alternatively, the drill string 12 and drill bit 15 may be rotated from the surface by a "top drive" type of drilling rig. Drilling mud 26 is contained in a pit 27 in the earth. A pump 29 pumps the mud into the drill string via a port in the swivel 19 to flow downward (arrow 9) through the center of drill string 12. The drilling fluid exits the drill string via ports in the drill bit 15 and then circulates upward in the region between the outside of the drill string and the periphery of the borehole, commonly referred to as the annulus, as indicated by the flow arrows 32. The drilling fluid thereby lubricates the bit and carries formation cuttings to the surface of the earth. The drilling fluid is returned to the pit 27 for recirculation.

Mounted within the drill string 12, generally near the drill bit 15, is a bottom hole assembly, referred to by reference numeral 100, which includes capabilities for measuring, processing, and storing information, and communicating with the earth's surface. In the example of the illustrated bottom hole arrangement, the logging tool 200 is positioned below drill collar 130. The collar 130 may be, for example, a pony collar or a collar housing measuring tools which perform measurement functions other than those described herein. Located above collar 130 is a surface/local communications subassembly 150. The subassembly 150 may include a toroidal antenna 1250 for local communication with the tool 200, and a known type of acoustic communication system that communicates with a similar system at the earth's surface via signals carried in the drilling fluid or mud (further described in U.S. Pat. No. 5,235,285).

The surface communication system in subassembly 150 includes an acoustic transmitter which generates an acoustic signal in the drilling fluid that is typically representative of measured downhole parameters. One suitable type of acoustic transmitter employs a device known as a "mud siren" which includes a slotted stator and a slotted rotor that rotates and repeatedly interrupts the flow of drilling fluid to establish a desired acoustic wave signal in the drilling fluid. The driving electronics in subassembly 150 may include a suitable modulator, such as a phase shift keying (PSK) modulator, which conventionally produces driving signals for application to the mud transmitter. These driving signals can be used to apply appropriate modulation to the mud siren. The generated acoustic mud wave travels upward in the fluid through the center of the drill string at the speed of sound in the fluid. The acoustic wave is received at the surface of the earth by transducers represented by reference numeral 31. The transducers, which are, for example, piezoelectric transducers, convert the received acoustic signals to electronic signals. The output of the transducers 31 is coupled to the uphole receiving subsystem 90 which is operative to demodulate the transmitted signals, which can then be coupled to processor 85 and recorder 45. An uphole transmitting subsystem 95 is also provided, and can control interruption of the operation of pump 29 in a manner which is detectable by the transducers in the subassembly 150 (represented at 99), so that there is two way communication between the subassembly 150 and the uphole equipment. In existing systems, downward communication is provided by cycling the pump(s) 29 on and off in a predetermined pattern, and sensing this condition downhole. This or other technique of uphole-to-downhole communication can be utilized in conjunction with the features disclosed herein. The subsystem 150 may also conventionally include acquisition and processor electronics comprising a microprocessor system (with associated memory, clock and timing circuitry, and interface circuitry) capable of storing data from a measuring apparatus, processing the data and storing the results, and coupling any desired portion of the information it contains to the transmitter control and driving electronics for transmission to the surface. A battery may provide downhole power for this subassembly. As known in the art, a downhole generator (not shown) such as a so-called "mud turbine" powered by the drilling fluid, can also be utilized to provide power, for immediate use or battery recharging, during drilling. It will be understood that alternative acoustic or other techniques can be employed for communication with the surface of the earth.

The logging tool 200 includes a pair of stabilizer blades 206 extending from the tool body to contact the borehole 11 walls as known in the art. The blades are equipped with electrodes 14a, 14b and electronics as described above. With this embodiment, the micro-resistivity measurement may be obtained while-drilling the borehole for real time evaluation. The tool 200 may also be implemented with a pair of antennas 205, 207 for additional electromagnetic measurements as described in the '037 patent.

Response to anisotropy is modeled from the log data assuming the borehole is vertical and parallel to the "z axis" of the transversely isotropic resistivity tensor. The mud resistivity corresponds roughly to an oil/water ratio of 90/10 and 70/30. Modeling code is used to solve Poisson's equation with complex conductivities. The mud and pad 9 body may be simulated as leaky dielectrics. It will be appreciated by those skilled in the art that various modeling and interpretation techniques may be used to generate the desired formation model. See for example, U.S. Pat. No. 5,461,562 (assigned to the present assignee).

Figure 4:
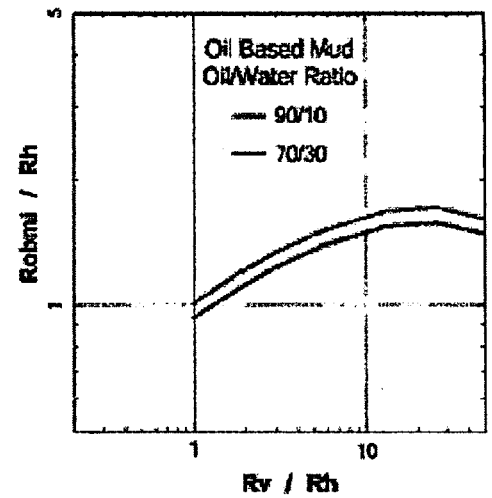
FIG. 4 is a cross plot of the response to anisotropy of a micro-resistivity tool in accord with the invention.

FIG. 4 illustrates the tool 10, 200 response to anisotropy. A 50–50% mixture of a 0.4 Ω-m shale is mixed with a sand resistivity ranging from 0.2 to 80 Ω-m, $R_h$ value ranging from 0.3 to 1 Ω-m and the vertical resistivity $R_v$ ranging from 0.3 to 50 Ω-m.

Under these conditions, the $R_{obmi}/R_h$ ratio has a maximum value of 1.7 for an $R_v/R_h$ ratio of 10. $R_{obmi}$ represents the resistivity log data obtained with the logging tool.

Figure 5A:
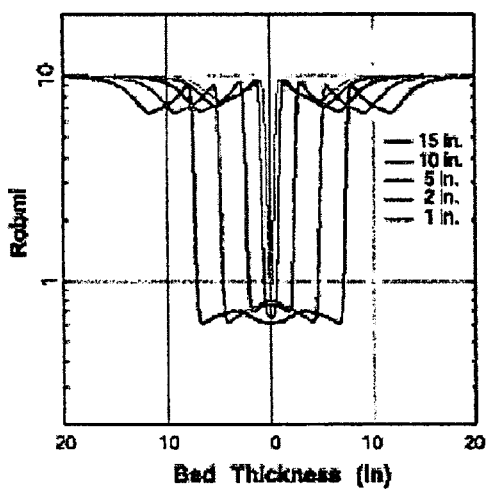
FIG. 5a is a plot of a simulated response to bed thickness for a micro-resistivity tool in conductive beds.
Figure 5B:
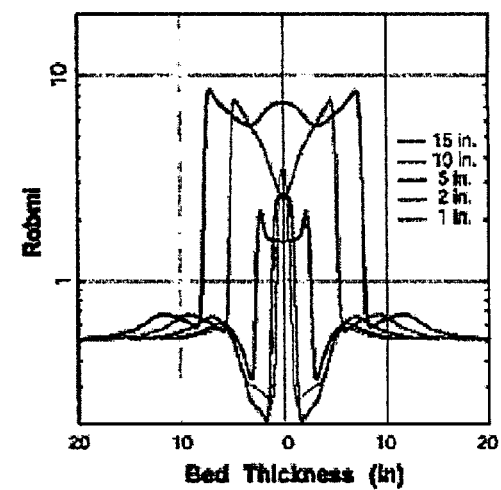
FIG. 5b is a plot of a simulated response to bed thickness for a micro-resistivity tool in resistive beds.

Thin Bed Response. Given a finite separation of about 0.4 in. [1.02 cm] between the voltage electrodes, the tool 10, 200 measures bed thickness with reasonable accuracy when the bed thickness is much larger than 0.4 in. [1.02 cm]. The simulated response to bed thickness ranging from 1 to 15 in. [2.54–38.1 cm] is shown in FIG. 5a for 0.5 Ω-m conductive beds with 10 Ω-m shoulders and in FIG. 5b for 10 Ω-m resistive beds with 0.5 Ω-m conductive shoulders. Ripples in the response to resistive beds correspond to the passage of the bed boundaries across the injector electrodes 14a, 14b. Clearly the response to conductive beds is relatively unaffected by shoulder effects. When a thin resistive bed is found between the electrodes, the current spreads deeper into the formation. As a result a resistive bed thinner than the pad 9 length will read less than true bed resistivity. However, for very thin beds peak-to-trough resistivity change is close to the true contrast between bed and shoulder.

Estimating Formation Anisotropy $R_h$, $R_v$. Whenever there is little or no oil-base mud invasion, which can easily be confirmed by the absence of curve separation of an induction-type instrument (for example as disclosed in U.S. Pat. No. 5,157,605), a micro-resistivity measurement acquired along the side of the borehole can be processed to estimate $R_h$, and $R_v$ in the direction facing the pad.

Over any arbitrary window length H, an estimate of $R_v$ can be calculated by convolving the micro-resistivity log with an averaging filter defined over a window length H. Similarly, $\sigma_h$, the reciprocal of $R_h$ can be estimated in the same manner by convolving the micro-conductivity $\sigma_{obmi}$, this time, with the averaging filter over the same window H. The following expressions define $R_h$, $R_v$, and $\sigma_h$:

$$\frac{1}{R_h(z)} = \int_{-H/2}^{+H/2} \frac{F_H(z-z')}{R_{obmi}(z')} dz', \tag{1}$$

$$R_v(z) = \int_{-H/2}^{+H/2} R_{obmi}(z') F_H(z-z') dz', \tag{2}$$

$$\sigma_h(z) = \int_{-H/2}^{+H/2} F_H(z-z') \sigma_{obmi}(z') dz'. \tag{3}$$

$R_{obmi}$ is the micro-resistivity log considered and $F_H$ is the averaging convolution filter.

Figure 6:
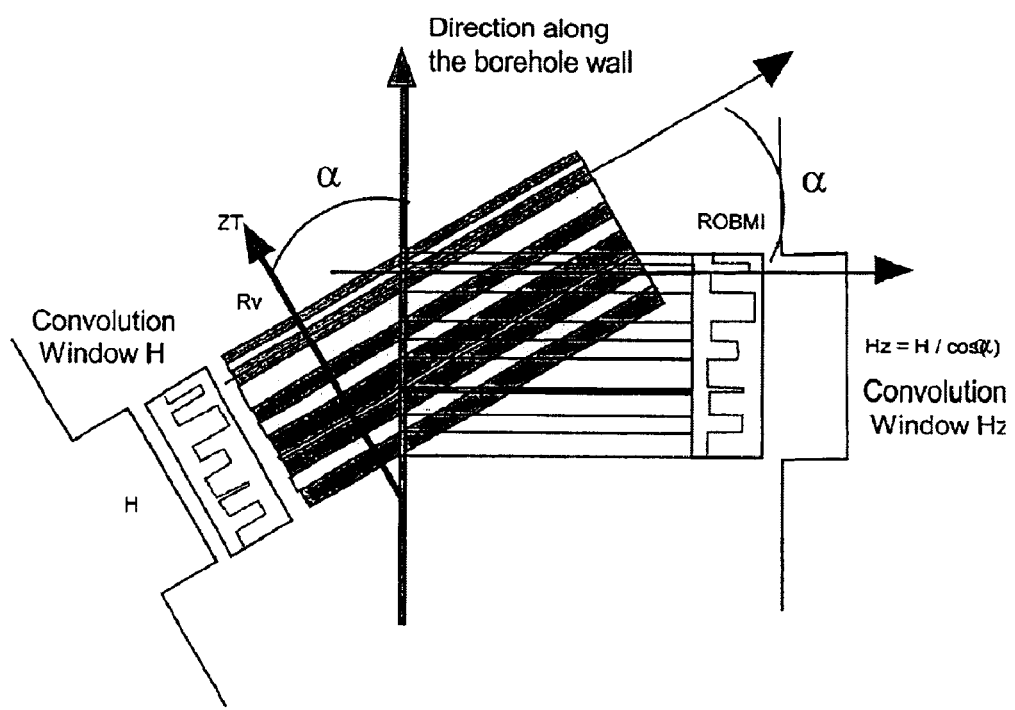
FIG. 6 is a schematic diagram illustrating a micro-resistivity measurement unaffected by the earth formation relative dip in accord with the invention.

As shown in FIG. 6, if the formation layers are dipping with respect to the tool axis, the above estimates are not affected by the value of the relative formation dip α since orientation does not change the relative proportion of each class over the convolution window.

Figure 8:
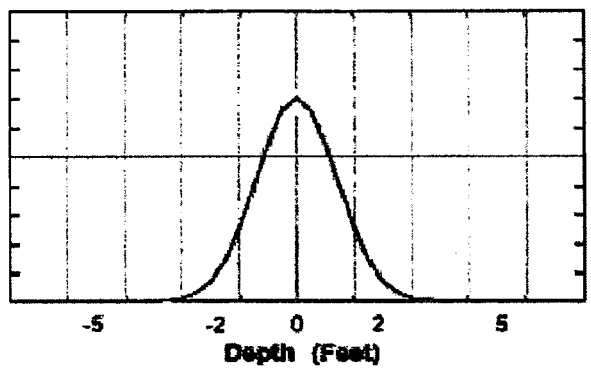
FIG. 8 shows a convolution filter response corresponding to the resistivity values of FIG. 7 in accord with the invention.
Figure 7:
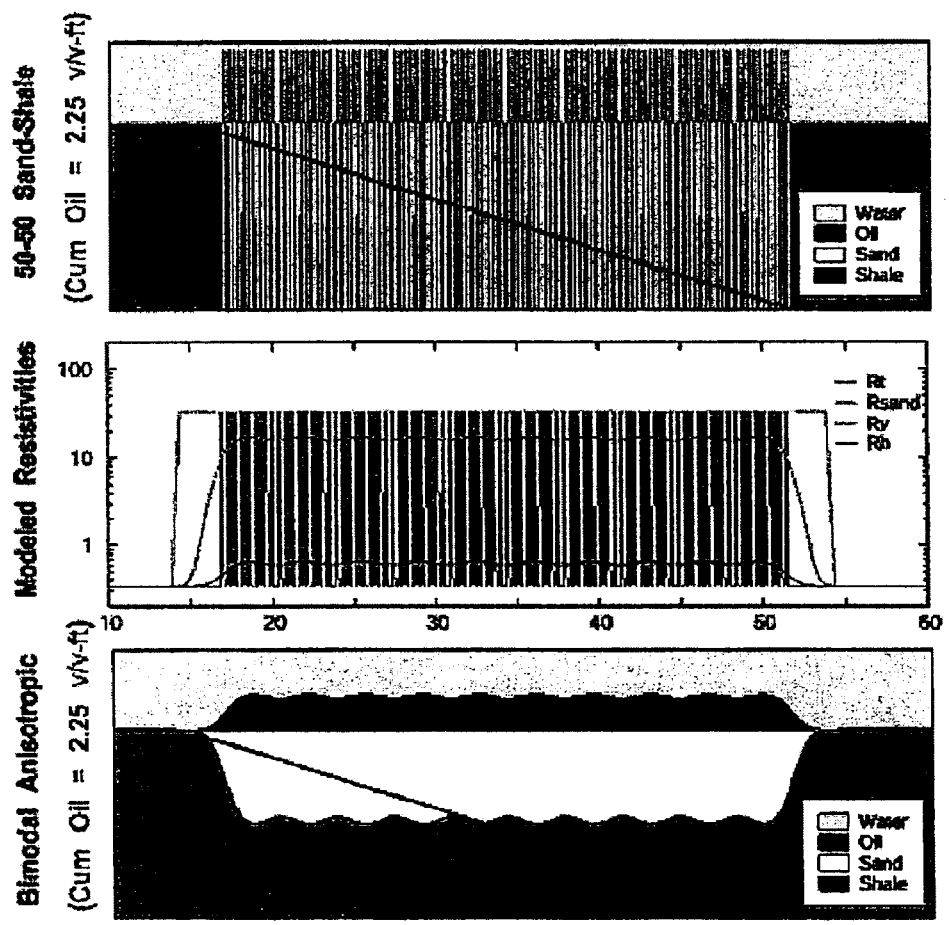
FIG. 7 illustrates a theoretical example of resistivity determinations for a laminated formation with a sand-shale mixture.

These estimates consider that either the tool rotation is negligible over the length of the convolution window, or that such rotation is compensated for by means of the inclinometer prior to processing the data. FIG. 7 illustrates a theoretical example of a laminated formation representing a 50–50% mixture of thin sand and shale. The corresponding $R_h$ and $R_v$ values are computed according to equations (1) and (2) with a 2-ft. [0.61 m] gaussian filter shown in FIG. 8.

Estimating Hydrocarbon Reserves from $R_v$ and $R_h$. As described in the following paragraph, the estimation of hydrocarbon volume from $R_h$ and $R_v$ is nonlinear. A common interpretation model used in the industry can be referred to as the Bimodal Anisotropic Model. Equations (4) to (8) express the relationship between $R_h$ and $R_v$ and the petrophysical parameters of both the sand and the shale.

$$1/R_h = 1/[F_{sand}/R_{sand} + F_{shale}/R_{shale}], \tag{4}$$

$$R_v = F_{sand} R_{sand} + F_{shale} R_{shale}, \tag{5}$$

$$\phi_t = F_{sand} \phi_{sand} + F_{shale} \phi_{shale}, \tag{6}$$

$$R_{sand} = R_w/[\phi_{sand}{}^m S_w{}^n], \tag{7}$$

$$F_{sand} + F_{shale} = 1. \tag{8}$$

Assuming a known value for shale resistivity $R_{shale}$, one can estimate from $R_h$, $R_v$ and total porosity $\phi_t$, the sand resistivity $R_{sand}$, the fractional volume of sand $F_{sand}$ and shale $F_{shale}$, and the sand porosity $\phi_{sand}$ (See for example, Tabanou J. R., et al., *Which resistivity should be used to evaluate thinly bedded reservoirs in high angle wells?*, SPWLA 1999, Oslo paper E).

As illustrated by FIG. 7, on average the volume of hydrocarbon calculated in this manner is equal to the theoretical volume of hydrocarbon when applied over a reservoir interval much larger than the convolution window. Alternatively assuming that the fractional volume of sand $F_{sand}$ is estimated from micro-resistivity sand count analysis, one can estimate a high resistivity $R_{sand}$ associated with hydrocarbon sand and a low resistivity associated with shale or silt resistivity (See for example, Shray F., et al., *Evaluation of Laminated Formations Using Nuclear Magnetic Resonance and Resistivity Anisotropy Measurements*, SPE 72370, 2001).

Figure 9:
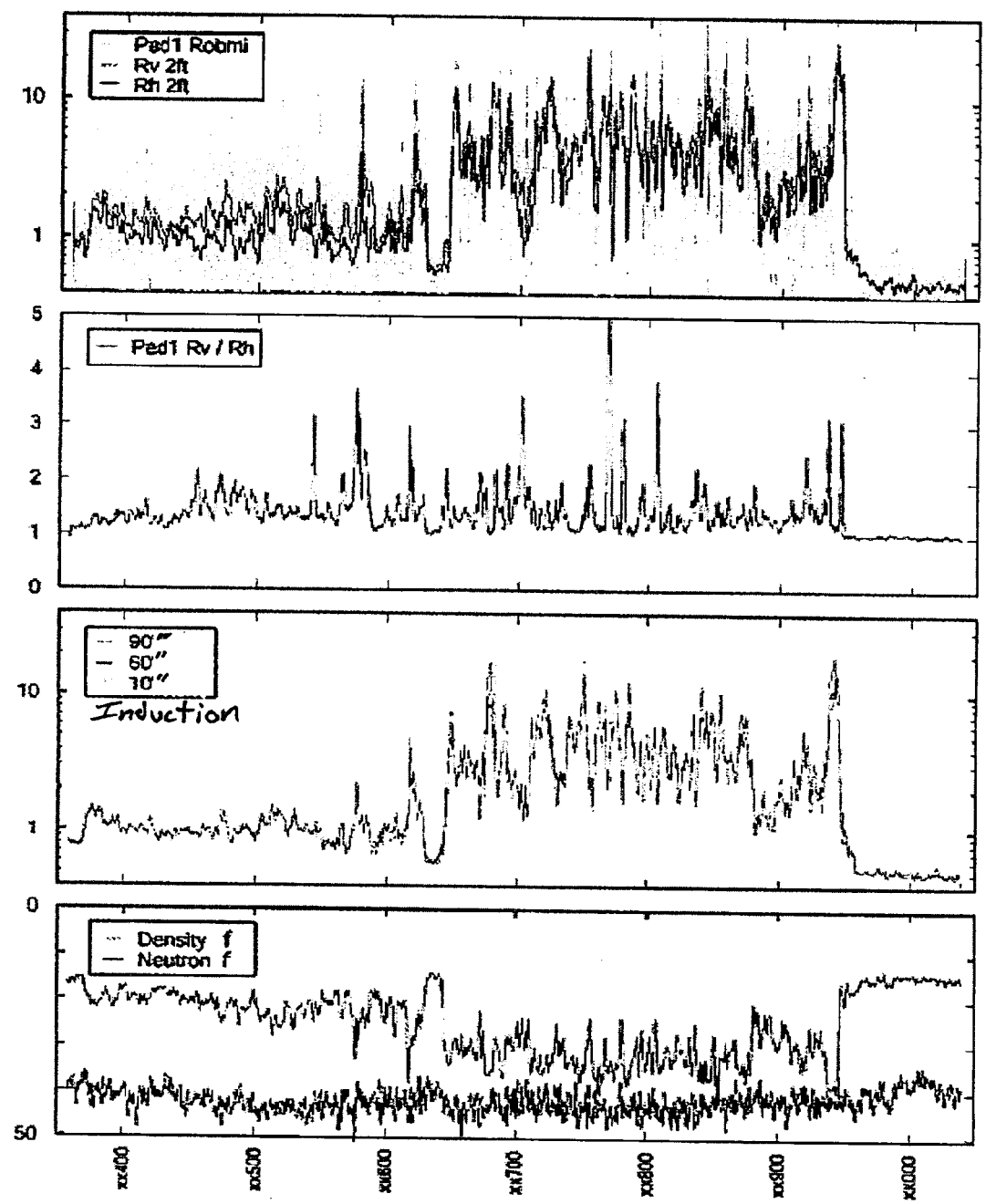
FIG. 9 shows, respectively from top-to-bottom, log data obtained with a micro-resistivity tool, an induction tool, and a neutron density tool in accord with the invention.

Log Example. FIG. 9 shows (from top to bottom) a micro-resistivity, induction, and neutron density log from a well drilled in the Gulf of Mexico. Approximately 600 ft. [182.9 m] of turbiditic sand was drilled with oil-based mud. The bottom half of the reservoir reveals a massive sand that is clearly hydrocarbon bearing. The top half of the reservoir separated from the bottom half by a 20-ft. [6.1 m] thick shale layer is shalier and displays a much lower horizontal resistivity $R_h$ as indicated by the induction log.

At the top of FIG. 9, the micro-resistivity log indicates a high degree of lamination and reveals the presence of thin resistive sand beds possibly hydrocarbon bearing. An 80-ft. [24.39 m] section of fall cores were recovered over the same interval.

Figure 10:
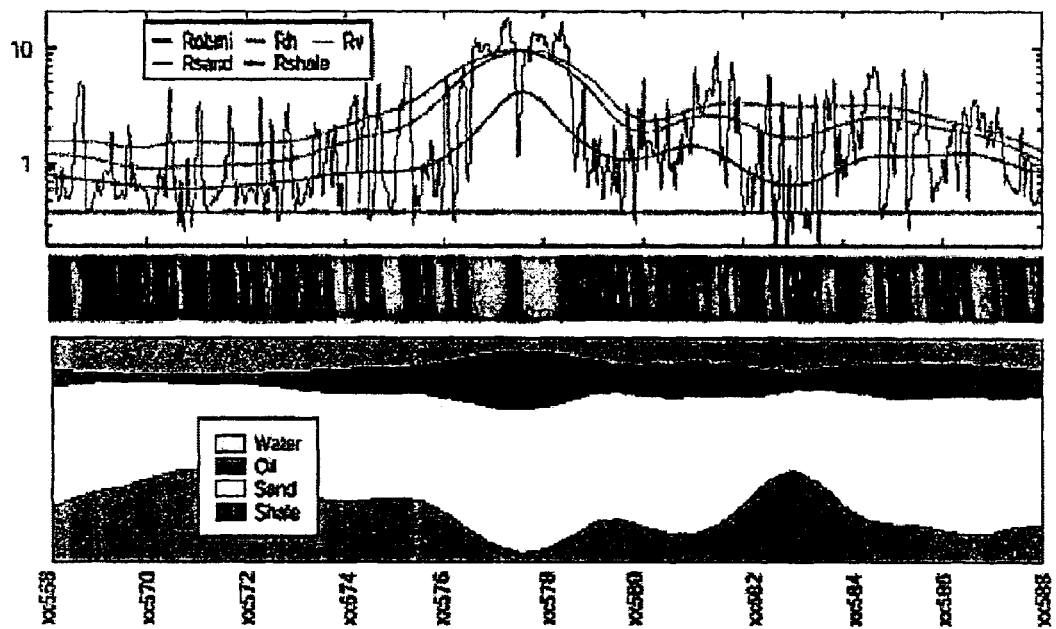
FIG. 10 shows micro-resistivity log data compared to well core images in accord with the invention.
Figure 10:
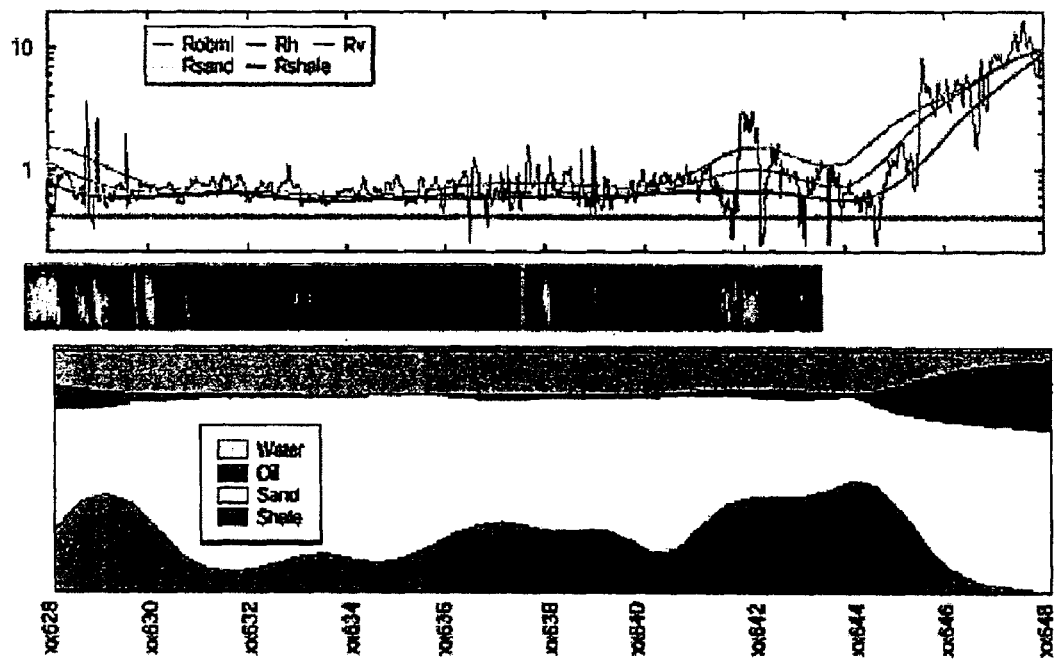

Estimating $R_v$, $R_h$ from micro-resistivity. Interpretation of the high-resolution data according to the invention involves calculation of $R_h$ and $R_v$. FIG. 10 shows the results of the centered pad buttons of the tool 10, 200 for two 20-ft. [6.1 m] intervals where core photographs were available. On the top of FIG. 10, pad micro-resistivity is displayed with $R_h$ and $R_v$ estimated over a 2-ft. [0.61 m] window according to Equation (1) and (2).

This interval is clearly anisotropic since $R_v$ is reading higher than $R_h$. In the middle of the interval a 1.5-ft. [0.46 m] bed has an $R_v$ value very close to the bed resistivity. In this interval $R_v/R_h$ is ranging from 1.5 to 4. Core photographs taken with UV light confirmed the presence of thin hydrocarbon bearing laminations.

The second interval shown at the bottom of FIG. 10 includes a massive shale over two-thirds of the interval. $R_v$ is nearly equal to $R_h$. Absence of hydrocarbon traces is confirmed on corresponding UV light photos. Since this estimation is practically instantaneous, the invention can be implemented in "real time" (at the time of acquisition) as the well is logged. No inversion or parameter need be adjusted or selected. The length of the convolution is variable. It can be selected from several inches to several feet or tens of feet depending on reservoir thickness and the objectives of the petrophysiscal evaluation. A 2 ft. [0.61 m] length was retained for this particular window since it corresponds to the vertical resolution at which standard logs are usually interpreted and is not intended to limit the scope of the invention.

Figure 11:
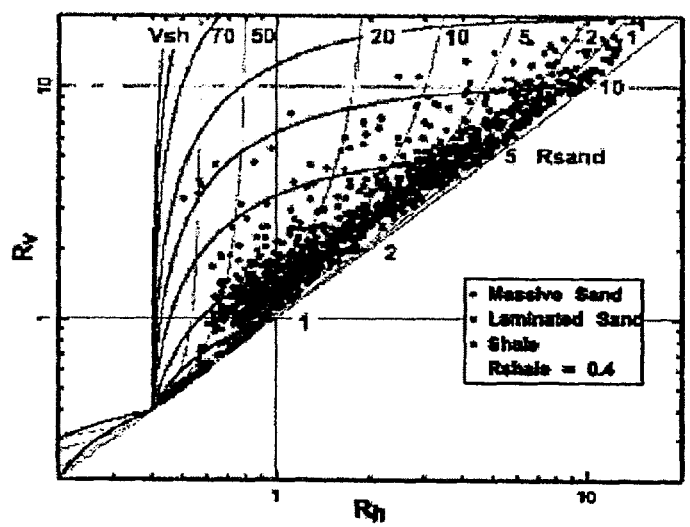
FIG. 11 is a Klein cross plot used to estimate resistivity parameters in accord with the invention.

Estimating reserves with the Bimodal Model. An estimate of the reserves may be obtained by inverting equations (4) through (8). To help in selecting the proper shale parameters, estimates of $R_v$ and $R_h$ are plotted in a Klein cross plot shown in FIG. 11. A template representing equations (4) and (5) is superimposed on the cross plot calculated with a shale resistivity value of 0.4 Ω-m. Points corresponding to the bottom half or the top half, as well as shale sections of the reservoir may be color-coded for easier identification. In the laminated sand at the top, the apparent $R_{sand}$ estimated over a 2-ft. [0.61 m] window is comprised between 1 and 3 Ω-m and the fractional volume of shale is comprised between 5 and 50%.

The total porosity is estimated from the log and a value of 0.40 Ω-m is picked for the shale resistivity. Apparent sand resistivity and fractional shale volume may be determined using the following equations (See Tabanou J. R., et al., *Which resistivity should be used to evaluate thinly bedded reservoirs in high angle wells?*, SPWLA 1999, Oslo paper E):

$$R_{sand}=[R_v/R_{shale}-R_{shale}/R_h+\text{sqrt}\{(R_v/R_{shale}-R_{shale}/R_h)^2-4(R_v-R_{shale})(1/R_{shale}-1/R_h)\}]/(2/R_{shale}-2/R_h), \quad (9)$$

$$F_{sand}=[R_{sand}/R_{shale}+R_{shale}/R_{sand}-R_v/R_{shale}-R_{shale}/R_h]/[R_{sand}/R_{shale}+R_{shale}/R_{sand}-2], \quad (10)$$

$$F_{sand}=1-F_{shale}. \quad (11)$$

Values for sand porosity $\phi_{sand}$, water saturation $S_w$, and oil volume $V_{oil}$ may also be derived from equations (6) and (7) for the following parameters, which are given as an example applicable to the example shown, a different reservoir will likely have different values for these parameters:

m=n=2

Shale porosity $\phi_{shale}$=0.21

Shale bound water resistivity $R_{wb}$=0.017 Ω-m

Shale resistivity $R_{shale}=R_{wb}/\phi_{shale}^2$=0.4 Ω-m

Formation water resistivity $R_w$=0.02 Ω-m

Maximum porosity $\phi_{Max}$=0.3573.

Figure 12:
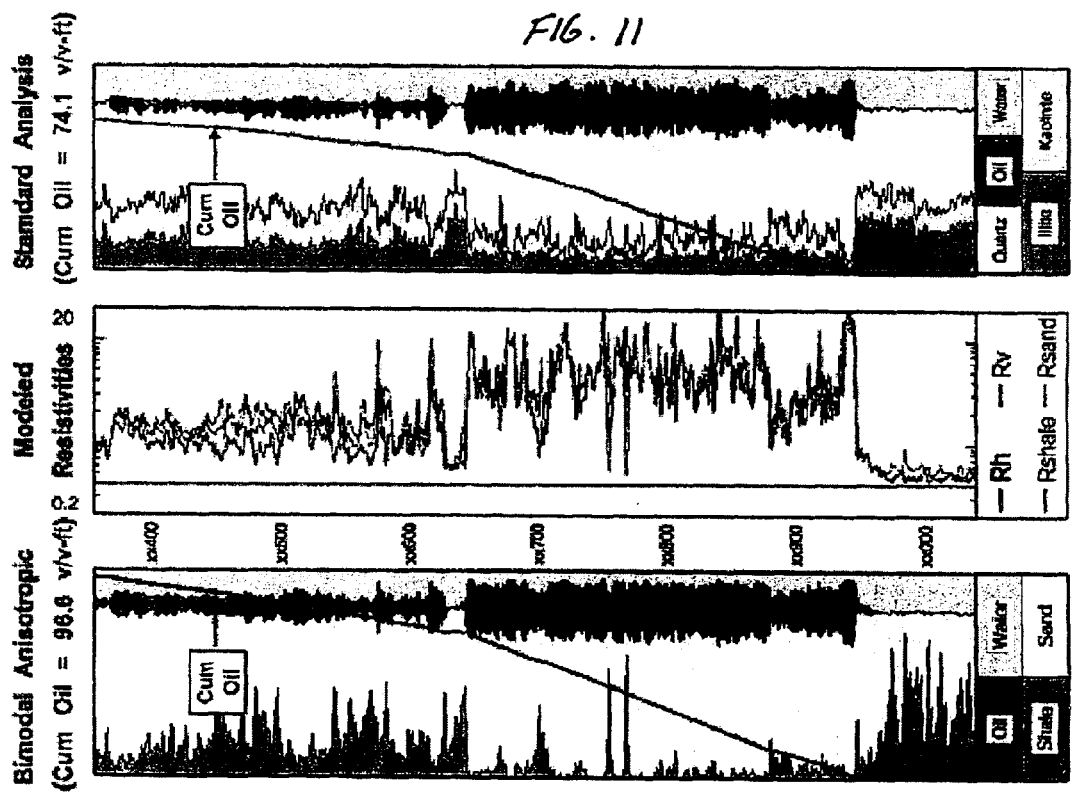
FIG. 12 shows log data comparisons in accord with the invention.
Figure 13:
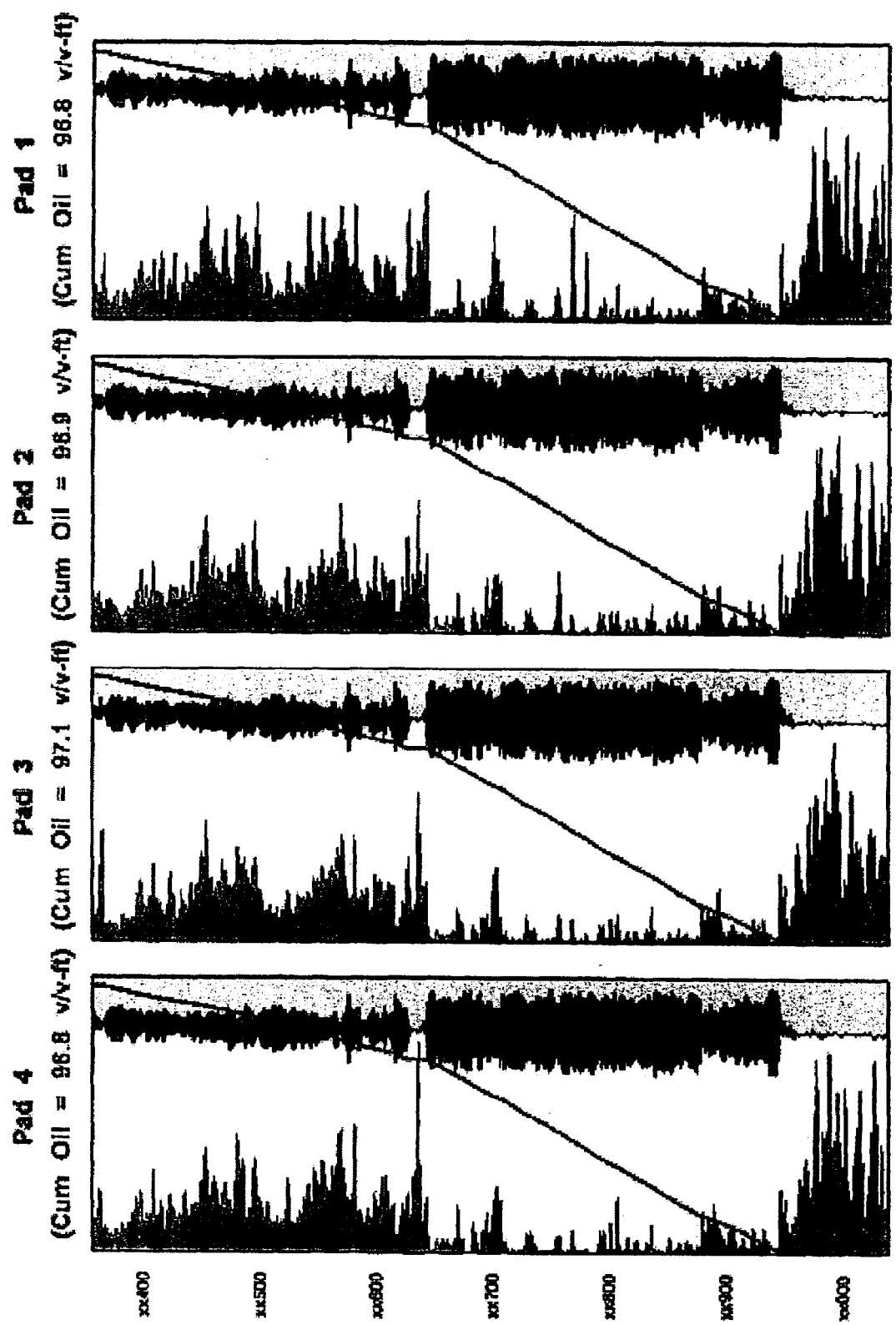
FIG. 13 shows log data comparisons in accord with the invention.

Turning to FIG. 12, the volumetric analysis of the entire reservoir interval from X950 ft. [289.6 m] up to X370 ft. [112.8 m] is compared to a standard analysis. An additional 30% increase in total hydrocarbon reserves is found in the laminated top section over estimates based on a standard logging suite. Although there are some differences on a fine scale between the tool 10, 200 pad micro-resistivity logs, the same analysis when applied to all the pads yields very similar overall hydrocarbon reserves as shown in FIG. 13.

An alternative embodiment of the invention involves inverting equations (4) and (5) to estimate $R_{sand}$ and $R_{shale}$, assuming that the sand and shale volume fraction $F_{sand}$ and $F_{shale}$ are known (See for example, Shray F., et al., *Evaluation of Laminated Formations Using Nuclear Magnetic Resonance and Resistivity Anisotropy Measurements*, SPE 72370, 2001). Greater precision may be obtained by referring to high resistivity for the hydrocarbon sand volume fraction $F_{sand}$ and low resistivity for the non-reservoir rock fraction, which can be either shale or silt or a mixture of both. The low resistivity is referred to herein as $R_{shale}$ for consistency.

The sand fractional volume $F_{sand}$ was estimated by a standard sand-count method applied to the high-resolution micro-resistivity $R_{obmi}$ (See for example, Cheung P., et al., *Field Test Results of a New Oil-Base Mud Formation Imager Tool*, SPWLA 2001, paper XX). The shale volume fraction $F_{shale}$ corresponds to $R_{obmi}$ values less than a cut-off of 1 Ω-m, while the sand volume fraction $F_{sand}$ corresponds to $R_{obmi}$ values greater than 1.8 Ω-m. $R_{obmi}$ values ranging between 1 and 1.8 Ω-m are classified as silt.

Using the above estimates for $F_{shale}$ and $F_{sand}$, $R_{sand}$ and $R_{shale}$ values were estimated from the following equations for two extreme cases.

$$R_{sand}=(1/2F_{sand})[-R_h+R_v+2R_hF_{sand}+/-\text{sqrt}(-4R_hR_vF_{sand}^2+(R_h-R_v-2R_hF_{sand})^2)]\{+/- \text{ if } R_{sand}>/<R_{shale}\}, \quad (12)$$

$$R_{shale}=1/(-2+2F_{sand})[(-R_h-R_v+2R_hF_{sand}+/-\text{sqrt}(-4R_hR_vF_{sand}^2+(R_h-R_v-2R_hF_{sand})^2)]\{+/- \text{ if } R_{shale}</>R_{sand}\} \quad (13)$$

Figure 14:
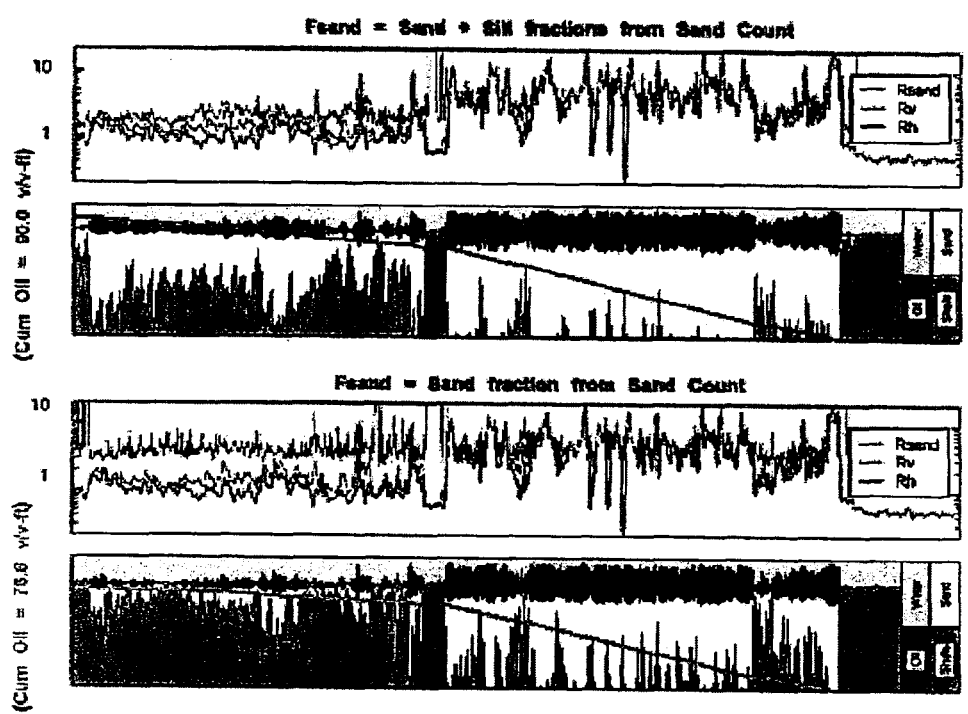
FIG. 14 shows log data for hydrocarbon evaluation in accord with the invention.

In the first case the shale fractional volume $F_{shale}$ includes the silt fractional volume $F_{silt}$. In the second case the sand fractional volume $F_{sand}$ includes the silt fractional $F_{silt}$. The corresponding volumetric analysis is shown in FIG. 14. In this case the estimate of hydrocarbon reserves is similar to the value obtained previously with the fixed $R_{shale}$. This approach is sensitive to input value of $F_{sand}$. The top logs in FIG. 14 represent the case where the volume of sand includes the volume of silt (in other words the silt is treated as a sand) silt with sands, the bottom logs where the volume of shale includes the volume of silt (in other words the silt is treated as a shale) silt with shale.

Comparison with simple sand count analysis. At this point results are compared between the approaches of the invention with the so called "sand count method" often used whenever a high-resolution log is available.

In the following table, the cumulative oil volume estimated from a simple sand count analysis is compared with standard evaluation and results obtained with previous approaches based on anisotropy-based interpretation.

| Interval: | X950 – X645 ft [289.6 – 196.6 m] | X630 – X370 ft [192 – 112.8 m] |
|---|---|---|
| sand interval | 250.6 ft [76.4 m] | 61.8 ft [18.84 m] |
| % of interval | 82% | 24% |
| average oil volume | 0.21 | 0.072 |

-continued

| Method | Cumulative Oil Volume (v/V – ft) |
|---|---|
| Sand Count | 66.4 |
| Standard interpretation | 74.1 |
| Rh,Rv inversion (with fixed Rshale) | 96.7 |
| Rh, Rv inversion (Fsand) | 76.6 |
| Rh, Rv inversion (Fsand + Fsilt) | 90 |

Figure 15:
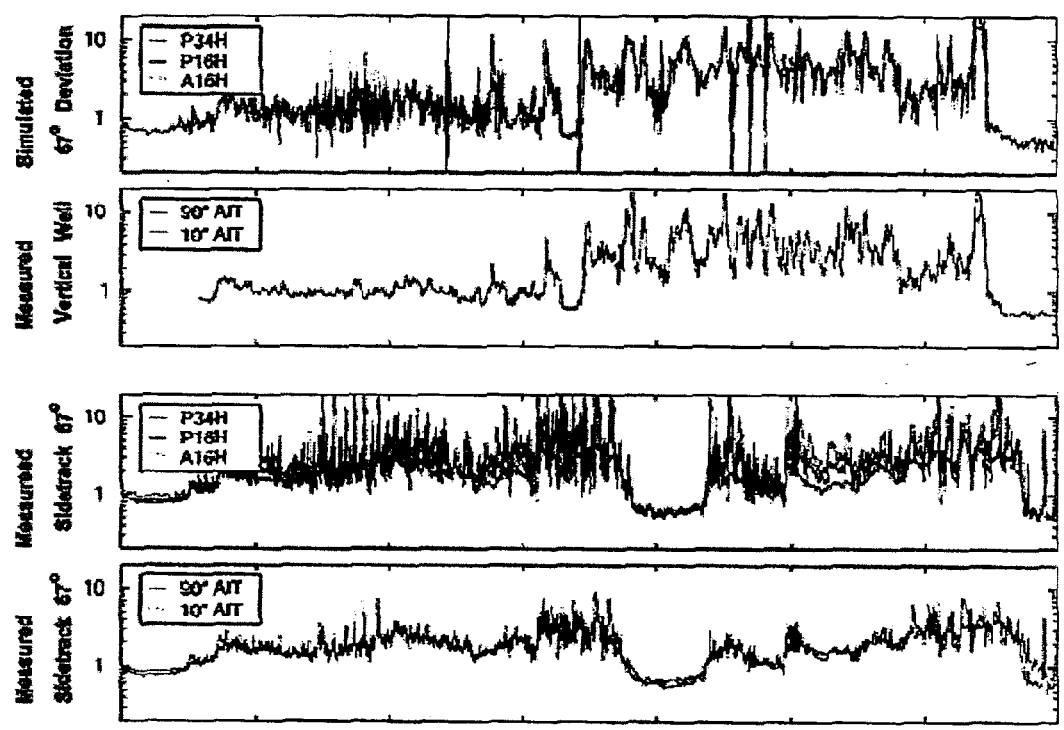
FIG. 15 shows, respectively from top-to-bottom, simulated propagation log data, measured induction log data, measured propagation log data, and measured induction log data for comparison in accord with the invention

Comparison with 2-MHz Resistivity logged in a sidetrack well. A 2-MHz propagation tool (for example as disclosed in U.S. Pat. Nos. 4,968,940 and 5,594,343) and an induction tool (for example as disclosed in U.S. Pat. No. 5,157,605) were run in a sidetrack well drilled more than 2 miles from the original well and up dip along the strike of the reservoir bedding. The hole deviation was 67 degrees. The local formation dip being about 15 degrees. The corresponding logs are shown on the bottom tracks of FIG. 15.

After squaring the micro-resistivity log from the tool 10, 200 pad, the response of the 2-MHz propagation resistivity was simulated for the same hole deviation. The resulting logs are shown on the top track of FIG. 15 with the original induction log run in the vertical well. The correlation between the two wells is excellent. Anisotropy affects both 2-MHz propagation logs, although more so for the logs run in the sidetrack well. Note that the induction log in the sidetrack well also reads higher resistivity, confirming that this interval is anisotropic and perhaps the quality of the reservoir and the amount of hydrocarbon is greater up dip.

As described above, alternative implementations of the invention may also entail combining and/or comparing the anisotropy or hydrocarbon estimations with an "indicator" (e.g., induction, propagation, neutron density, or well core data) associated with the investigated formation.

Extending to other micro-resistivity logs in water-base mud (WBM) and to LWD. The techniques of the invention can be extended to wells drilled with WBM. In this case, invasion is not ignored. But as a real-time indicator this approach is useful in while-drilling identification or later while logging anisotropic intervals and providing a lower limit on the $R_v/R_h$ ratio.

Comparison Between Bulk and High-Resolution Measurements. On one hand, methods to estimate formation anisotropy based on averaging the bulk formation properties over several feet or averaging high-resolution micro-resistivity logs over specified windows have intrinsic limitations. Micro-resistivity derived $R_h$, $R_v$ are affected by oil mud invasion. If deep invasion by the oil phase is present, this method will be overestimating the anisotropic properties of the formation. In addition it is inaccurate whenever layers are missed because they are below the tool resolution. Finally, this method does not apply to the case of rock formation exhibiting intrinsic micro-anisotropy.

On the other hand, tools measuring bulk anisotropy will be too optimistic whenever thin high resistive layers (like tight carbonate streaks) are inter-bedded within thinly laminated sand shale sequences. A tool measuring average bulk anisotropy over several feet would not be able to correct for such an effect on its own. Clearly high-resolution measurements provide a unique piece of information in the interpretation of anisotropic reservoirs.

As a significant number of deep-water offshore turbiditic reservoirs are thinly laminated it is often crucial to decide in real time whether or not to perform expansive well testing. The traditional sand count method can be done only after the entire well has been logged and analyzed, and it requires massive sands for calibration.

It will be appreciated that the invention may be implemented in a program storage device readable by a processor and encoding a program of instructions including instructions for performing the operations described herein. By programming one or more suitable general-purpose computers having appropriate hardware, the present invention provides new and improved techniques to evaluate the properties of a thinly laminated anisotropic reservoir in real time. The programming may be accomplished through the use of one or more program storage devices readable by the computer processor and encoding one or more programs of instructions executable by the computer for performing the operations described herein. The program storage device may take the form of, for example, one or more floppy disks; a CD-ROM or other optical disk; a magnetic tape; a read-only memory chip (ROM); and other forms of the kind well known in the art. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here.

Lumped reserves can then be easily estimated over any specified interval providing the "big picture" to the asset managers and reservoir engineers. With little or no invasion present, the micro-resistivity measurements can detect beds thinner than 2 in. [5.08 cm] and estimate the resistivity of beds in the range of 6 in. [15.2 cm] thick. For thinner beds, however, more precise reserve estimation may be obtained with appropriate bed thickness correction prior to calculation of $R_h$ and $R_v$. The degree of formation anisotropy, and as a result, the potential for containing hydrocarbon, is estimated. High resistivity layers associated to tight non-reservoir rocks are excluded prior to estimating the formation anisotropy and reserve estimation.

For the purposes of this specification it will be clearly understood that the word "comprising" means "including but not limited to", and that the word "comprises" has a corresponding meaning. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for evaluating a thinly bedded earth formation traversed by a borehole to determine the formation anisotropy or hydrocarbon profile, comprising:
   (a) with the borehole containing a substantially non-conductive fluid, injecting a current into the formation and measuring a signal associated with the current at the wall of said borehole to determine a resistivity parameter of said formation;
   (b) calculating a resistivity value $R_h$ parallel to the beds and a resistivity value $R_v$ perpendicular to the beds of the formation using the determined resistivity parameter; and
   (c) determining the anisotropy or hydrocarbon profile using the calculated parallel resistivity value $R_h$ and perpendicular resistivity value $R_v$.

2. The method of claim 1, wherein the measured signal associated with the current at the wall of the borehole consists of a voltage.

3. The method of claim 1, further comprising determining the invasion of the substantially non-conductive fluid into said formation.

4. The method of claim 1, wherein said method is performed during or after drilling of said borehole.

5. The method of claim 1, wherein the current is injected and the signal is measured using a logging tool adapted to inject said current into the formation and to measure voltage and current signals on electrodes disposed thereon.

6. The method of claim 1, wherein step (b) includes determining a thickness of a bed within said formation.

7. The method of claim 1, wherein step (c) includes defining a model of said formation.

8. The method of claim 1, wherein the parallel resistivity value $R_h$ is calculated from the following expression:

$$\frac{1}{R_h(z)} = \int_{-H/2}^{+H/2} \frac{F_H(z-z')}{R_{obmi}(z')} dz',$$

where $R_{obmi}$ is the determined resistivity parameter obtained with a tool adapted to inject said current and to measure said signal;

$F_H$ is a filter;

H is a window length related to said filter; and z is an axis reference.

9. The method of claim 1, wherein the perpendicular resistivity value $R_v$ is calculated from the following expression:

$$R_v(z) = \int_{-H/2}^{+H/2} R_{obmi}(z') F_H(z-z') dz',$$

where $R_{obmi}$ is the determined resistivity parameter obtained with a tool adapted to inject said current and to measure said signal;

$F_H$ is a filter;

H is a window length related to said filter; and z is an axis reference.

10. The method of claim 9, wherein the parallel resistivity value $R_h$ is calculated from the following expression:

$$1/R_h = 1/[F_{sand}/R_{sand} + F_{shale}/R_{shale}],$$

where $F_{sand}$ is a fractional sand volume;

$R_{sand}$ is a sand resistivity;

$F_{shale}$ is a fractional shale volume; and $R_{shale}$ is a shale resistivity.

11. The method of claim 1, further comprising comparing or combining the determined anisotropy or hydrocarbon profile with an indicator associated with said formation.

12. The method of claim 11, wherein the indicator consists of a core sample, core data, or a core image retrieved from said borehole.

13. The method of claim 11, wherein the indicator consists of a formation parameter derived from a model of said formation.

14. The method of claim 11, wherein the indicator consists of formation parameter data obtained with a separate logging tool disposed within said borehole.

15. A system for evaluating a thinly bedded earth formation traversed by a borehole containing a substantially non-conductive fluid to determine the formation anisotropy or hydrocarbon profile, comprising:

a logging tool adapted for disposal within the borehole;

said tool adapted to inject a current into the formation to measure a signal associated with the current at the wall of said borehole to determine a resistivity parameter of said formation;

computer means adapted to calculate a parallel resistivity value $R_h$ and a perpendicular resistivity value $R_v$ of the formation using the determined formation resistivity parameter; and means to determine the anisotropy or hydrocarbon profile using the calculated parallel resistivity value $R_h$ and perpendicular resistivity value $R_v$.

16. The system of claim 15, wherein said tool is adapted to measure a voltage at the wall of said borehole.

17. The system of claim 15, further comprising means to determine the invasion of the substantially non-conductive fluid into said formation.

18. The system of claim 15, further comprising means to determine a thickness of a bed within said formation.

19. The system of claim 15, further comprising means to define a model of said formation.

20. The system of claim 15, the computer means further comprising means to calculate the parallel resistivity value $R_h$ from the following expression:

$$\frac{1}{R_h(z)} = \int_{-H/2}^{+H/2} \frac{F_H(z-z')}{R_{obmi}(z')} dz',$$

where $R_{obmi}$ is the determined resistivity parameter obtained with a tool adapted to inject said current and to measure said signal;

$F_H$ is a filter;

H is a window length related to said filter; and z is an axis reference.

21. The system of claim 15, the computer means further comprising means to calculate the perpendicular resistivity value $R_v$ from the following expression:

$$R_v(z) = \int_{-H/2}^{+H/2} R_{obmi}(z') F_H(z-z') dz',$$

where $R_{obmi}$ is the determined resistivity parameter obtained with a tool adapted to inject said current and to measure said signal;

$F_H$ is a filter;

H is a window length related to said filter; and z is an axis reference.

22. The system of claim 21, the computer means further comprising means to calculate the parallel resistivity value $R_h$ from the following expression:

$$1/R_h = 1/[F_{sand}/R_{sand} + F_{shale}/R_{shale}],$$

where $F_{sand}$ is a fractional sand volume;

$R_{sand}$ is a sand resistivity;

$F_{shale}$ is a fractional shale volume; and $R_{shale}$ is a shale resistivity.

23. The system of claim 15, further comprising means to compare or combine the determined anisotropy or hydrocarbon profile with an indicator associated with said formation.

24. The system of claim 23, wherein the indicator consists of core data retrieved from said borehole.

25. The system of claim 23, wherein the indicator consists of a formation parameter derived from a model of said formation.

26. The system of claim 23, wherein the indicator consists of formation parameter data obtained with a separate logging tool disposed within said borehole.

27. The system of claim 16, wherein the tool is further adapted to measure current signals on electrodes disposed thereon.

28. The method of claim 1, further comprising the step of defining a processing window parallel to the well bore having a length H, wherein H is independent of a spacing of measurement electrodes.

29. The method of claim 28, wherein length H is a selectable length.

30. The system of claim 15, further comprising the step of defining a processing window parallel to the well bore having a length H, wherein H is independent of a spacing of measurement electrodes.

31. The system of claim 30, wherein length H is a selectable length.

* * * * *